Patented May 31, 1932

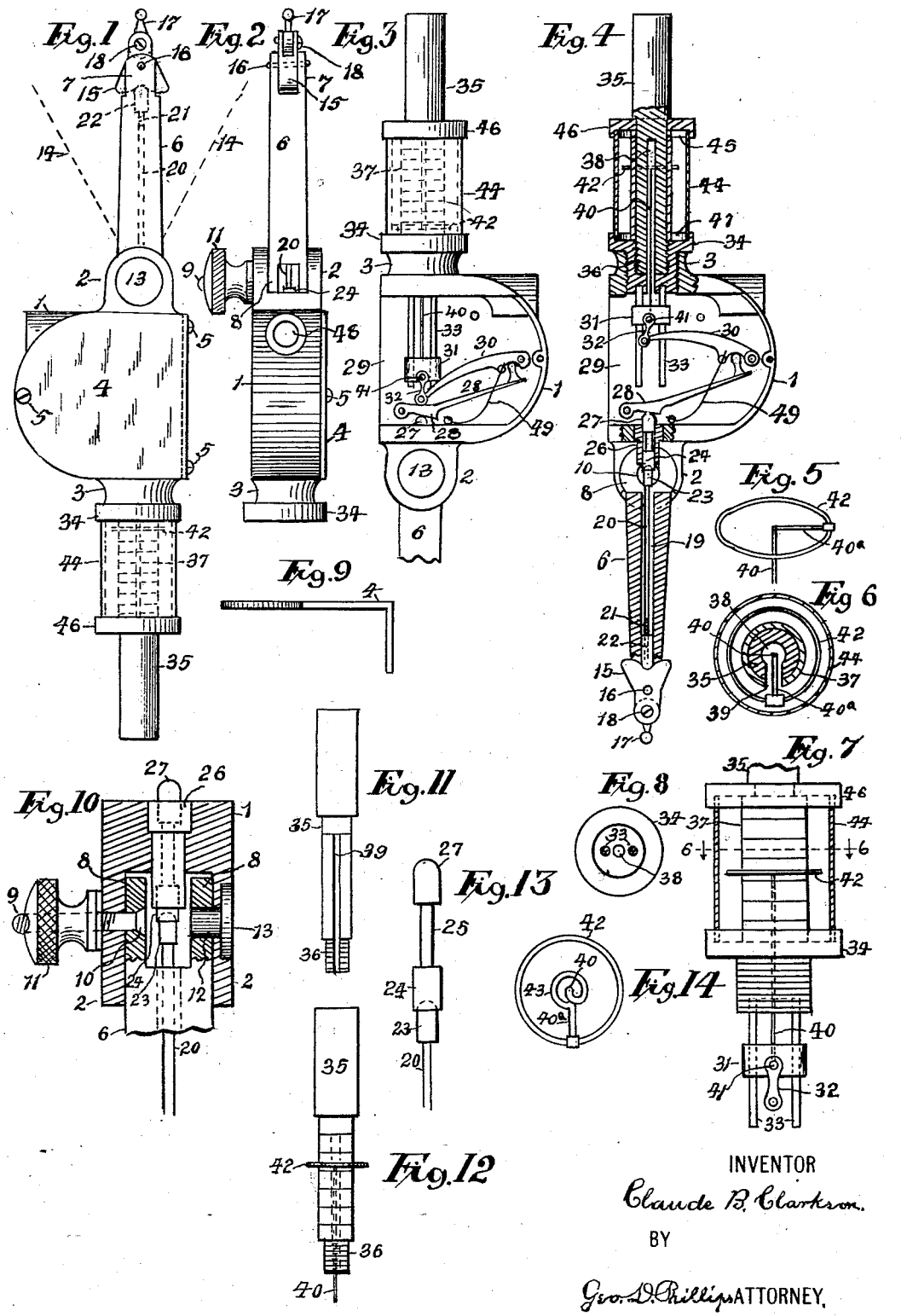

1,860,993

UNITED STATES PATENT OFFICE

CLAUDE B. CLARKSON, OF BRIDGEPORT, CONNECTICUT

TEST INDICATOR

Application filed March 13, 1929. Serial No. 346,548.

My invention relates to test indicators of the type used for accurately truing up or centralizing work for machining on the various types of machine tools, one of its principal features being to provide the instrument with a cylindrical dial with the indicating end of its pointer encircling the dial so that the pointer and the readings on the dial will always be visible to the operator during the rotation of the indicator. Instruments of like character have been provided with graduated dials that are out of the operator's vision for a greater part of the rotation of the instrument, thus making it very difficult to obtain a correct condition of all parts of the object being gauged.

In describing the invention in detail, reference will be had to the accompanying drawings wherein like characters of reference denote corresponding parts in the several views in which Figure 1 represents an elevation of the instrument.

Figure 2 is a side view of the instrument partly broken.

Figure 3 is a broken plan view with the cover removed.

Figure 4 is a broken plan view partly in section with the cover removed.

Figure 5 is an enlarged view in perspective of the ring pointer and broken view of its actuating rod.

Figure 6 is an enlarged view of the dial mechanism on line 6—6 of Figure 7.

Figure 7 is an enlarged broken elevation partly in section of the dial and some of its mechanism.

Figure 8 is an enlarged bottom plan view of the dial nut and rod sections.

Figure 9 is a side elevation of the cover.

Figure 10 is an enlarged broken view partly in section of a part of the internal mechanism of the device.

Figure 11 is a detail view of the dial supporting rod.

Figure 12 is a modified view wherein the rod itself forms the dial encircled by the ring pointer.

Figure 13 is a part of the lever actuating mechanism, and

Figure 14 is an enlarged plan view of the ring pointer.

1 represents the body of the instrument having integral therewith the fork 2 on one end, and the hub 3 on the opposite end, and 4 is the cover secured to the body by the screws 5.

6 is an arm having the outer forked end 7 and the inner forked end 8 operatively located within the fork 2 of the body as seen more clearly in Figure 10. 9 is a bolt projecting through one of the sides of the fork end 2, and also through one of the sides of the forked end 8 of the arm 6. The inner end of the bolt has the taper head 10 seated in a correspondingly tapered recess of the fork 8. On the outer threaded end of the bolt is mounted the adjusting nut 11 adapted to maintain the arm 6 in frictional contact with the fork 2. The opposite side of the forked end 8 is mounted on the pintle 12 of the plug 13. The arm 6 is journaled on the bolt and pintle and it may have more or less side movement, see dotted lines 14, Figure 1, under friction. The ball and socket contact between the rod 20 and the short rod section 25 must be located, Figure 20, as near as possible on the axis of the journals on which the arm 6 has a lateral movement. If said contact is above or below said axis it will form a leverage that will actuate the pointer when the arm 6 is moved out of axial alignment with the dial. The movement transmitted by the cam 15 through the compound levers is too slight to perceptively change the position of said ball and socket connection with respect to said axis.

Referring to Figures 1, 2 and 4, 15 is a cam located in the forked end 7 of the arm 6 and journaled on the pin 16. The opposite forked end of this cam carries the ball contact 17 frictionally held to the cam by the screw 18. 19, Fig. 4, is an opening through the axis of the arm 6 for the small rod 20 on whose outer threaded end 21 is mounted the head 22 normally resting on the lowest point of the cam 15. The threaded connection between the rod 20 and head is for the purpose of taking up the wear of the several contact points of the mechanism.

23 is a head mounted on the inner end of rod 20 and it has, Figures 10 and 13, a ball and socket engagement with the lower end 24 of the short rod section 25 operatively mounted in the bushing 26. The head 27 of this short rod section engages the pivotal lever 28 located, Figures 3 and 4, in the recess 29 of the body 1. The outer end of this lever is in operative contact with the pivoted lever 30, whose outer end is pivotally connected to the reciprocating slide 31 by means of the link 32. This slide is mounted on the rods 33 anchored in the inner end of the nut 34, see also Figure 8.

35, Figures 4 and 11, is a stud whose inner threaded end 36 is seated in a threaded hole in the outer end of the nut 34. Referring also to Figure 6, 37 is the dial of paper or other suitable material closely wrapped about said stud. 38 is a hole extending through the axis of this stud and the nut 34. 39 is a longitudinal kerf cut through one side of the stud 35 and the dial 37.

40, Figures 3, 4, and 7, is a small pointer rod whose inner end is journaled, not shown, to the lower end of the pin 41 of the link 32. This rod passes freely through the central opening of said stud and nut and its offset outer end $40^a$ is attached to the ring pointer 42 encircling the dial 37, as also seen in Figure 6. The kerf 39 in the side of the stud 35 and dial 37 will provide a free passage for the offset part $40^a$ of the pointer mechanism during the movement of the pointer over the dial.

To avoid frictional contact of the ring pointer 42 with the dial, or its rod 40 with the sides of the axial opening in the stud 35 and nut 34, I prefer to lengthen the offset arm $40^a$, Figure 14, sufficient to form the spiral shaped figure 43 as an integral part of the rod 40. The part 43 will practically fill the central opening 38 of the stud and without frictional contact therewith, and thus centralize the rod 40 and also permit a closer relation between the ring pointer and dial. It is quite evident that the paper dial could be dispensed with and the body of the stud 35, Figure 12, could be graduated and utilized as a cylindrical dial.

To protect the ring pointer, I prefer to surround it and the cylindrical dial with the tube 44 of any transparent and unbreakable material, and to seat the same in the recess 45, Figure 4, of the collar 46 and the recess 47 of the nut 34.

In use, the outer end of the stud 35 may be held in drill press chucks, adapters, or other suitable holding means, or extension tools can be inserted in the opening 48 of the body. When truing up work, the contact ball 17 of the rotatable instrument is brought against the surface of the work, and the slightest unevenness or eccentricity thereof will tilt the lever 15 and send its impulse through the various connected mechanism to the ring pointer 42. The compound lever feature will minimize the amount of movement necessary for the mechanism connected with the arm 6, so that, the slightest impulse given to the levers 28 and 30, will correspondingly increase the travel of the ring pointer over the face of the cylindrical dial, and all irregularities of any part of the work will always be visible to the operator regardless of the instrument's position, and when the ring pointer remains stationary during the truing up process, the operator will know that the work is true.

While the delicate spring 49 will easily return the several moving parts to their normal positions, Figure 3, it will offer no appreciable resistance to a movement in the opposite direction as shown in Figure 4. This spring simply keeps the levers 28 and 30 in contact in any position they may occupy.

The frictional engagement of the contact ball feature with the cam 15, will permit it to give way and slightly tilt when meeting with an unevenness of the work being tested. But when the resistance is too great for the ball to overcome, the arm 6 will laterally respond and thus prevent injury to the instrument. The portions of the cam 15 projecting outside of the arm 6 can also be used as contact points, and especially on flat surfaces.

While I show an intermediate compound leverage system for transmitting movement from the cam 15 to the ring pointer, any simple and equally effective means may be substituted therefor.

The advantage derived from an instrument of this character and construction will be greatly appreciated by all skilled workmen, as the cylindrical dial, and its encircling pointer, will always be visible to the operator in whatever position the instrument is placed.

Having thus described my invention what I claim is:—

1. A test indicator of the character described having a graduated cylindrical dial, said dial having an axial opening, a pointer encircling the dial having a depending rod in said opening, a body having a chamber, a nut detachably mounted on the body, said dial being detachably mounted on the nut, said nut having an axial opening aligned with the dial opening, a slide in said chamber connected to the pointer rod, a support for the slide carried by the dial supporting nut, two levers, designated as primary and secondary, in said chamber, opposed pivotal supports for the levers, a link pivoted to the slide and to the free end of the primary lever, the free end of the secondary lever being in operative contact with the primary lever.

2. A test indicator of the character described, comprising a body member having a chamber pointer mechanism, comprising a pointer rod and slide primary and secondary levers pivotally mounted in said chamber, the free end of the primary lever pivotally connected to the slide, and the free end of the latter lever in pivotal contact with the primary lever, said body having an opening therethrough, a bushing fixed in said opening, a rod section mounted in said bushing and whose inner end projects into said chamber and normally contacts with said secondary lever, said body having a forked extension, journals mounted thereon, an elongated arm having a forked extension pivotally supported on said journals, said arm having an axial opening therethrough, a cam member pivotally supported to the outer end of said arm, a work contact member frictionally pivoted to the cam, a rod operatively mounted in the axial opening of the arm whose outer end contacts with said cam, and whose inner end has a ball and socket connection with the outer end of said rod section, said ball and socket connection being located on the axial line of said journals so that the movement of the arm will not actuate the dial mechanism.

3. A construction as in claim 2, in which said journals comprise a stud having a pintle mounted in one branch of the forked extension of the body, a rod in the opposite branch of said forked extension, the forked end of the arm being journaled on said pintle and rod, the inner end of said rod having a retaining head bearing against the inner face of a branch of the forked arm, and a nut mounted on the rod to maintain the arm in frictional engagement with the forked extension of the body.

In testimony whereof I affix my signature.

CLAUDE B. CLARKSON.